(12) United States Patent
Reeb et al.

(10) Patent No.: US 6,990,994 B2
(45) Date of Patent: Jan. 31, 2006

(54) VALVE FOR INFLATABLE ARTICLE

(75) Inventors: David L. Reeb, Columbia, MD (US); Brian E. Le Gette, Baltimore, MD (US)

(73) Assignee: Kelsyus, LLC, Virginia Beach, VA (US)

( * ) Notice: Subject to any disclaimer, the term of this patent is extended or adjusted under 35 U.S.C. 154(b) by 369 days.

(21) Appl. No.: 10/368,492

(22) Filed: Feb. 21, 2003

(65) Prior Publication Data

US 2004/0163707 A1    Aug. 26, 2004

(51) Int. Cl.
*F16K 15/14*    (2006.01)
*F16K 15/20*    (2006.01)

(52) U.S. Cl. ............... 137/223; 137/232; 137/854; 446/224

(58) Field of Classification Search ............... 137/223, 137/232, 854; 446/224
See application file for complete search history.

(56) References Cited

U.S. PATENT DOCUMENTS

| | | |
|---|---|---|
| 679,519 A | 7/1901 | Smith |
| 827,823 A | 8/1906 | Starr |
| 1,185,684 A | 6/1916 | Kraft et al. |
| 1,237,041 A | 8/1917 | Hilding |
| 1,942,959 A | 1/1934 | Fenton |
| 2,044,913 A | 6/1936 | Miller |
| 2,482,198 A | 9/1949 | Melichar |
| 2,595,406 A | 5/1952 | Popovich |
| 2,710,622 A | 6/1955 | Chupa |
| 2,767,735 A | 10/1956 | Darling |
| 2,772,692 A | 12/1956 | Russell |
| 2,803,527 A | 8/1957 | Lundahl |
| 2,839,073 A | 6/1958 | Marsh |
| 2,887,120 A | 5/1959 | De See |
| 2,977,973 A | 4/1961 | Chakine |
| 3,085,591 A * | 4/1963 | Schneider ............... 137/854 |
| 3,086,698 A | 4/1963 | Goldstein |
| 3,785,395 A | 1/1974 | Andreasson |
| 3,995,653 A | 12/1976 | Mackal et al. |
| 4,073,389 A | 2/1978 | Angarola et al. |
| 4,146,070 A | 3/1979 | Angarola et al. |
| 4,579,141 A | 4/1986 | Arff |
| 4,678,014 A | 7/1987 | Owen et al. |
| 4,823,831 A | 4/1989 | Jaw |
| 4,872,678 A | 10/1989 | Coons |
| 5,040,793 A | 8/1991 | Chen |
| 5,083,581 A | 1/1992 | Jaw |
| 5,203,831 A | 4/1993 | Lind et al. |
| 5,267,363 A | 12/1993 | Chaffee |
| 5,343,889 A | 9/1994 | Jaw |
| 5,351,711 A | 10/1994 | Peter |
| 5,367,726 A | 11/1994 | Chaffee |

(Continued)

FOREIGN PATENT DOCUMENTS

DE    25 54 719 A1    6/1977

(Continued)

OTHER PUBLICATIONS

Printout of http://www.shipstore.com/ss/html.SEV/SEVB-V.html illustrating Boston Valve screw in valve, printed on Feb. 10, 2003, 3 pages.

(Continued)

*Primary Examiner*—John Rivell
(74) *Attorney, Agent, or Firm*—Cooley Godward LLP

(57) ABSTRACT

A valve is provided that includes a body portion defining a conduit and a control element coupled to the body portion and configured to selectively engage the body portion adjacent the conduit. The control element is configured to be axially repositioned based on axial movement of the body portion.

20 Claims, 6 Drawing Sheets

U.S. PATENT DOCUMENTS

| | | |
|---|---|---|
| 5,601,112 A | 2/1997 | Sekiya et al. |
| 5,915,407 A | 6/1999 | West |
| 6,237,621 B1 | 5/2001 | Chaffee |
| 6,460,560 B1 | 10/2002 | Weinheimer et al. |
| 6,508,264 B2 | 1/2003 | Chaffee |
| 2002/0083975 A1 | 7/2002 | Chaffee |
| 2002/0189670 A1 | 12/2002 | Peach |

FOREIGN PATENT DOCUMENTS

| | | |
|---|---|---|
| DE | 27 01 556 A1 | 7/1978 |
| EP | 0 852 296 A2 | 7/1998 |
| GB | 797059 | 6/1958 |
| GB | 941239 | 11/1963 |
| GB | 947559 | 1/1964 |

OTHER PUBLICATIONS

Printout of http://bartswatersport.com/mulrepbosvall.html illustrating Replacement Boston/Schraeder Valve, printed on Feb. 10, 2003, 1 page.

Photographs of valve publicly available more than one year prior to Feb. 21, 2003 (5 pages).

* cited by examiner

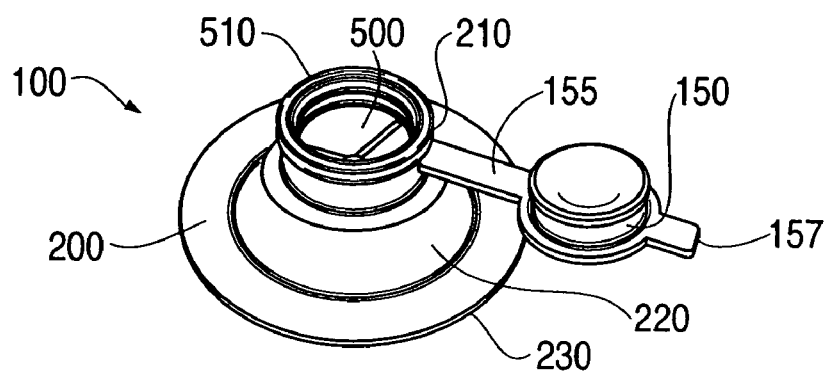
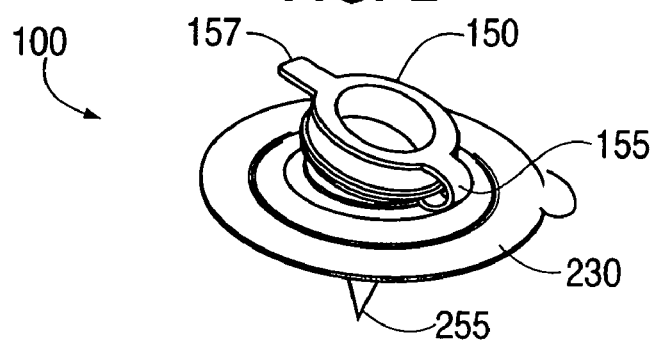
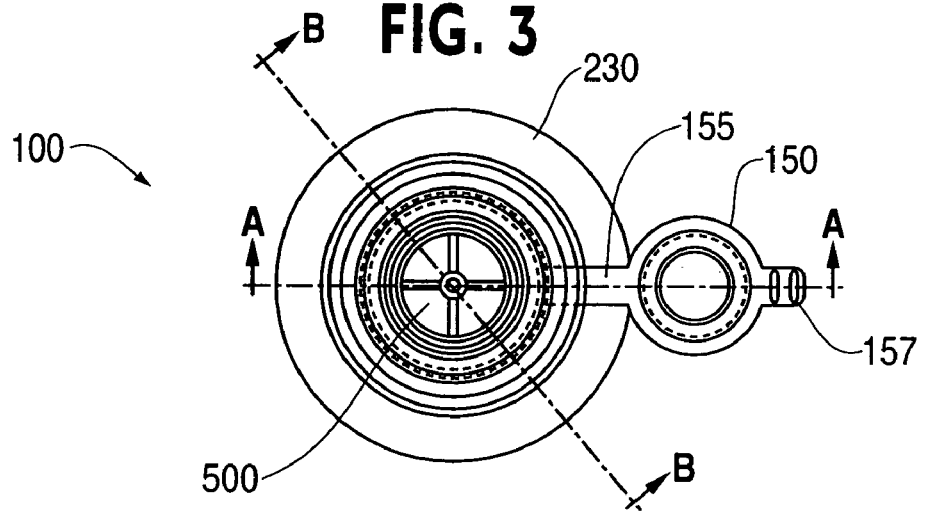

VALVE FOR INFLATABLE ARTICLE

BACKGROUND

The invention relates to valves for inflatable articles, and more particularly to a reconfigurable valve that can be used for rapid inflation with low back pressure and rapid deflation of an inflatable article to which the valve is attached.

Inflatable articles are widely used for various activities. For example, inflatable articles such as floats, tubes and lounges are often used in the water to support at least a portion of a person above the water. Other inflatable articles used in the water include beach balls, water-sport assemblies and the like. Inflatable devices such as air mattresses are also widely used. Regardless of configuration, inflatable devices include at least one valve for inflating and deflating the device.

Simpler devices, such as small pool floats, beach balls or the like, typically include a small valve that facilitates the introduction of air into the device. Such valves are often small enough for a person to put their mouth around to blow air into the device. The valves typically include a check valve assembly that prevents the flow of air when the valve is in its default position. By manipulating the valve (e.g., squeezing the valve) the check valve is able to open to allow the passage of air.

These simpler valves are cumbersome to use because the person inflating the device is required to either squeeze the valve with their fingers, leaving less room on the valve stem around which to place their mouth, or bite the valve while blowing air into the device. The valve typically includes an integral membrane that is coupled to the passageway of the valve almost completely around its perimeter. By squeezing the valve stem, the small part of the membrane that is not sealed to the passageway of the valve stem is lifted away from the stem, thereby allowing air to pass. Hence, these valves are difficult to inflate, deflate slowly and have significant back pressure during inflation.

Other valves that are used with inflatable articles include removable check valves. The check valve operates primarily as a conventional check valve and allows air to be introduced into the device, but does not allow air out of the device. When a user desires to deflate the device, the check valve is simply removed by the user. Such valves are problematic because the constant insertion and removal of the check valve can cause unnecessary wear on the valve along with the risk of misplacing the check valve and/or improperly reinserting the check valve. Such valves are also extremely expensive to produce.

Other valves include valve bodies that allow air to be introduced into the article to which they are attached, and which can be completely removed from the article to allow the article to deflate. Complete removal of the valve body could be problematic if the valve body is lost. Moreover, the constant removal and replacement of the valve could cause excess wear on the valve and the associated portion of the inflatable article.

Thus, there is a need for an easily manufactured valve for use with inflatable articles that is easily repositioned to allow for easy rapid inflation and rapid deflation without having to disassemble any portion of the valve.

SUMMARY OF THE INVENTION

The invention includes a body portion defining a conduit and a control element coupled to the body portion and configured to selectively engage the body portion adjacent the conduit. The control element is configured to be axially repositioned based on axial movement of the body portion.

BRIEF DESCRIPTION OF THE DRAWINGS

The invention is described with reference to the accompanying drawings. In the drawings, like reference numbers indicate similar elements.

FIG. 1 is a perspective view of the valve according to an embodiment of the invention in a first configuration.

FIG. 2 is a perspective view of the valve illustrated in FIG. 1 in a second configuration.

FIG. 3 is a top plan view of the valve illustrated in FIG. 1.

DETAILED DESCRIPTION

Figure 4:
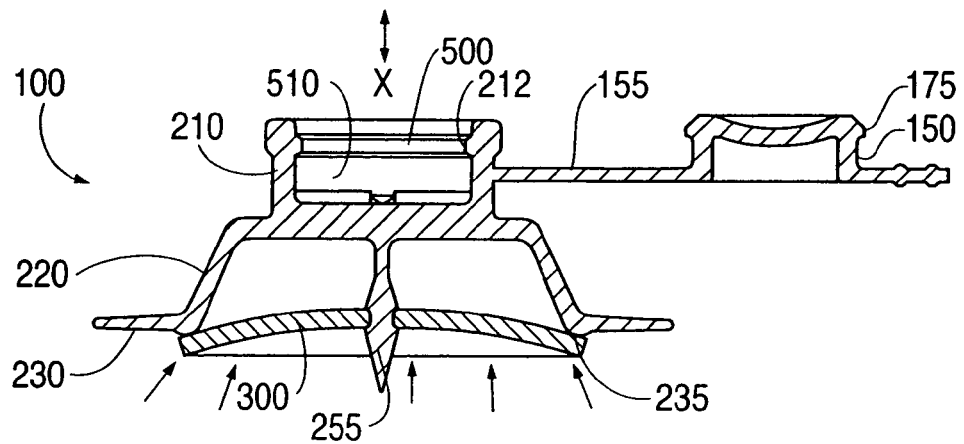
FIG. 4 is a cross-sectional view of the valve illustrated in FIG. 1 taken along the line A—A in FIG. 3, when the valve is in the first configuration.

FIGS. 1–12 illustrate a valve 100 according to an embodiment of the invention. The valve 100 includes a valve body 200 that defines a conduit 500 having a first opening 510 and a second opening 520. The valve 100 also includes a substantially flexible control element or check valve 300 that is configured to control the flow of air through the conduit into the inflatable device to which the valve 100 is coupled.

Figure 7:
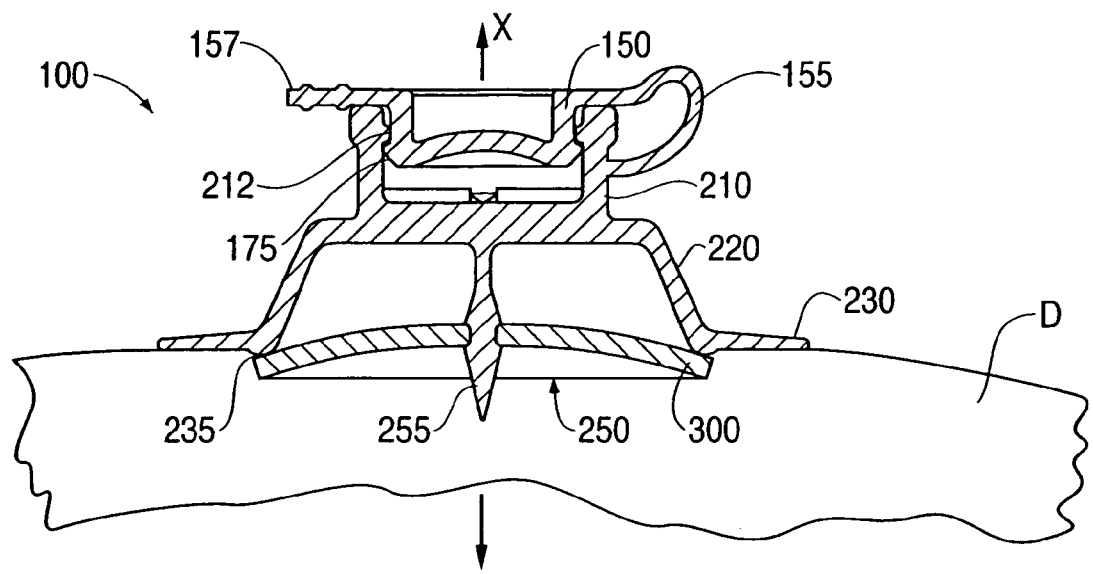
FIG. 7 is a cross-sectional view of the valve illustrated in FIG. 1 taken along the line A—A in FIG. 3, when the valve is in the first configuration and the valve cap is in a closed position.
Figure 8:
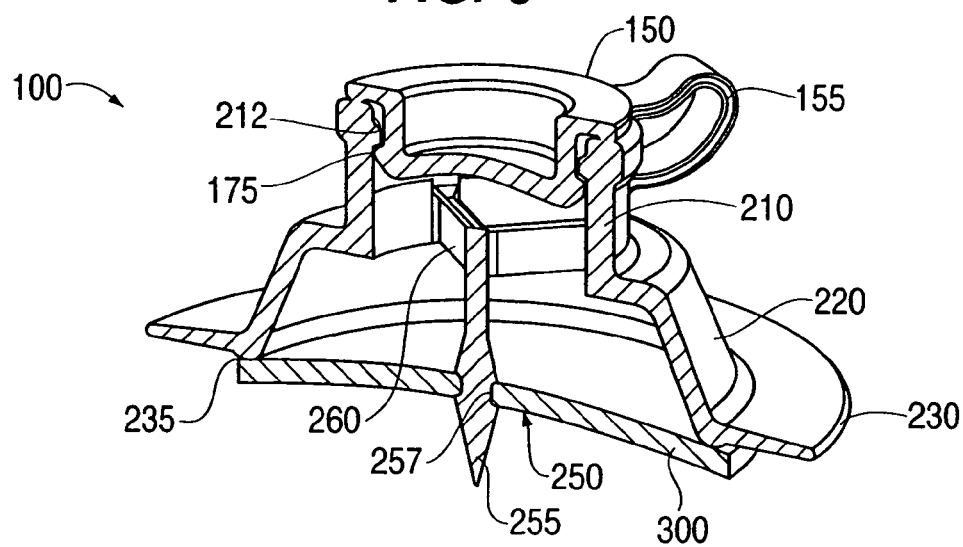
FIG. 8 is a is a cross-sectional view of the valve illustrated in FIG. 1 taken along the line B—B in FIG. 3, when the valve is in the first configuration and the valve cap is in a closed position.
Figure 9:
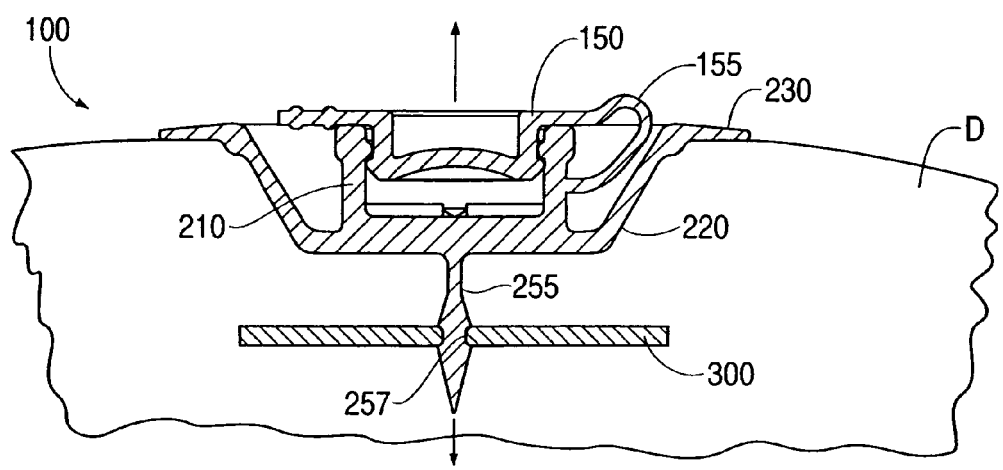
FIG. 9 is a cross-sectional view of the valve illustrated in FIG. 1 taken along the line A—A in FIG. 3, when the valve is in a second configuration and the valve cap is in a closed position.

The valve 100 is movable between a first configuration illustrated in FIGS. 1, 3 and 4–8, in which the valve body 200 is expanded, and a second configuration illustrated in FIGS. 2 and 9–12, in which the valve body 200 is collapsed or retracted. In the first configuration, the valve body 200 is disposed substantially above the surface of a device D to which it is attached as best seen in FIG. 7. In the second configuration, the valve body 200 is disposed substantially below the surface of the device D as best seen in FIG. 9.

In the illustrated embodiment, the valve body 200 includes a first chamber 210, a second chamber 220 disposed coaxially with the first chamber 210, and a base 230. The first chamber 210 has a first end 211 and a second end 213, and defines a diameter across the openings. The second chamber 220 has a first end 221 defining a first diameter and a second end 222 defining a second diameter across. The second diameter of the opening of the second chamber 220 is greater than the diameter of the first opening 210. The diameters defined by the openings of the second chamber 220 may be identical or may be different depending upon the configuration of the second chamber 220. The conduit 500 extends between the first end 211 of the first chamber 210 and the second end 222 of the second chamber 220. The body 200 can be a unitary construction or can be fabricated from different materials.

The base 230 of the valve body 200 is configured to be coupled to an inflatable device. The base 230 can be adhered to the outside of the device D as illustrated in FIGS. 7 and 9 or can be disposed between layers of material of the device D. Alternatively, the base 230 can be completely or partially disposed below the surface of device D. Regardless of the configuration, the base 230 is positioned such that it is not readily removed from the device D during normal operation.

The base 230 defines a valve seat 235 for the check valve 300. The valve seat 235 can be, for example, a ridge against which the check valve 300 rests as in the illustrated embodiment. Alternatively, the valve seat 235 can be a recess defined in the base 230 in which the check valve 300 can be disposed while in the first configuration. The valve seat 235 can also be a raised flange extending from the base 230 in which the check valve 300 can be disposed while in the first configuration. Alternatively, the valve seat could be recessed into the second chamber 220. Regardless of the arrangement, the valve seat 235 provides a surface against which the check valve 300 can sealingly engage to prevent the flow of air out of the valve 100 when the valve is in the first configuration.

The check valve 300 can be coupled to the valve body 200 by a retention element 250. The retention element 250 can maintain the check valve 300 in position with respect to the valve body 200. In the illustrated embodiment, the retention element 250 is positioned substantially within the conduit 500. The retention element 250 can include, for example, a plurality of ribs 260, or a single, rigid rib, extending into the conduit 500. The ribs 260 can be disposed entirely within the first chamber 210, entirely within the second chamber 220, or can extend across both the first chamber 210 and the second chamber 220. Extending from the ribs 260 is a support post 255. The support post includes a detent 257 to which the check valve 300 can be secured. Accordingly, the check valve 300 defines an opening 310 that is configured to slidably engage the support post 255.

The check valve 300 is coupled to the valve body 200 such that regardless of whether the valve 100 is in the first configuration or the second configuration, the check valve 300 is a fixed distance from the first chamber 210.

The check valve 300 can be fabricated from the same material as the valve body 200 or a different material. The check valve 300 can be fabricate from materials such as rubber, plastic and the like.

In the illustrated embodiment, the valve 100 includes a cap 150 that is configured to be removably positioned within the conduit 500 within the first opening 510. The conduit 500 can include a flange 212 that engages a flange 175 on the cap 150 to provide an air-tight connection between the cap 150 and the valve body 200. A connector 155 can be coupled between the cap 150 and the valve body 200 to prevent loss of the cap 150. The cap 150 can be readily moved between an open position as illustrated in FIGS. 1–6, 11 and 12 and a closed position as illustrated in FIGS. 7–10. The valve 100 need not include a cap as in the illustrated embodiment. As will be appreciated, the valve 100 of the invention can function without the cap 150.

Figure 5:
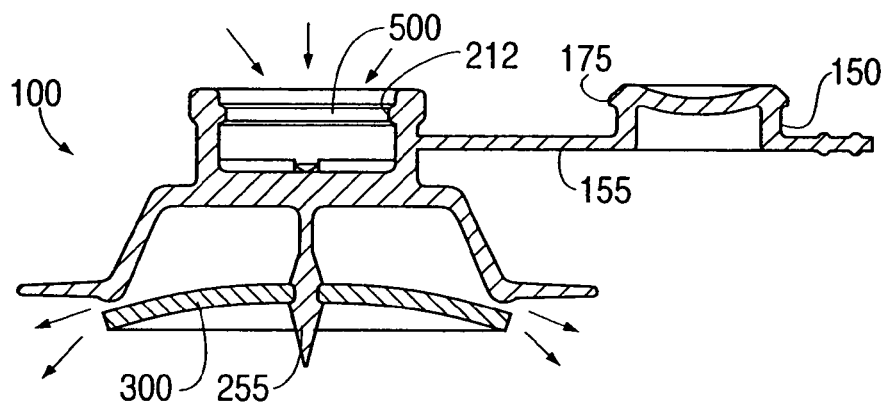
FIG. 5 is a cross-sectional view of the valve illustrated in FIG. 1 taken along the line A—A in FIG. 3, when the valve is in the first configuration and air is being introduced into the valve.
Figure 6:
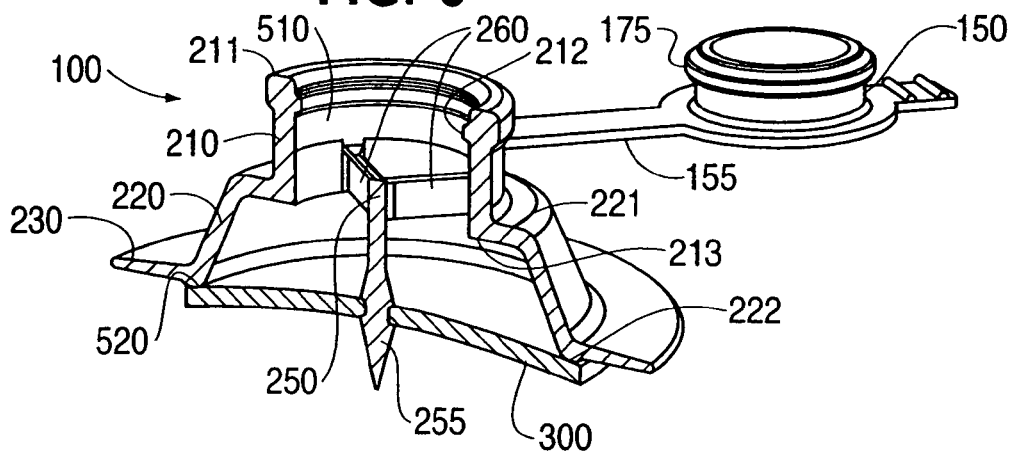
FIG. 6 is a is a cross-sectional view of the valve illustrated in FIG. 1 taken along the line B—B in FIG. 3, when the valve is in the first configuration.

In use, when the valve 100 is in the first configuration, a user may easily introduce air into the valve 100. In the first configuration, the valve 100 is disposed above the device D to which it is attached with the first chamber 210 being disposed above the second chamber 220, and the check valve 300 is sealingly coupled adjacent the second end 222 of the second chamber 220. When air is introduced into the valve 100 through the conduit 500, the check valve 300 flexes as illustrated in FIG. 5 to allow the air to pass into the device D. When the user stops blowing into the valve 100, the check valve returns to its default sealed position as illustrated in FIGS. 4 and 6–8.

When the valve 100 is in the first configuration, air will not escape through the valve 100 as long as the check valve 300 is in place. The cap 150 need not be positioned in the valve 100 to prevent air from exiting the valve 100. The cap 150, however, provides additional sealing capabilities when the valve is in the first configuration.

The valve 100 can be axially repositioned along axis X to its second configuration by pushing the valve body 200 such that the first chamber 210 is disposed substantially within the second chamber and is concentric with the second chamber 220. In the second configuration, the first chamber 210 and the second chamber 220 are both disposed below the base member 230.

Alternatively, the first end 221 of the first chamber 210 can be coplanar with the base member 230.

Figure 10:
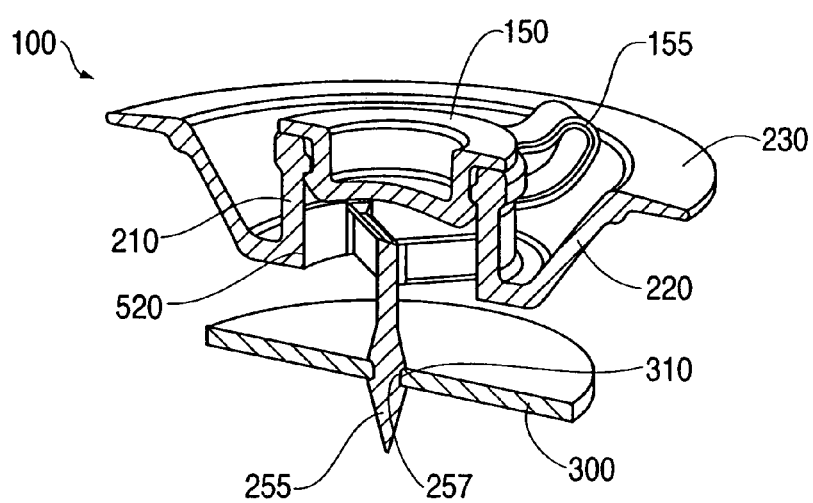
FIG. 10 is a is a cross-sectional view of the valve illustrated in FIG. 1 taken along the line B—B in FIG. 3, when the valve is in the second configuration and the valve cap is in a closed position.
Figure 11:
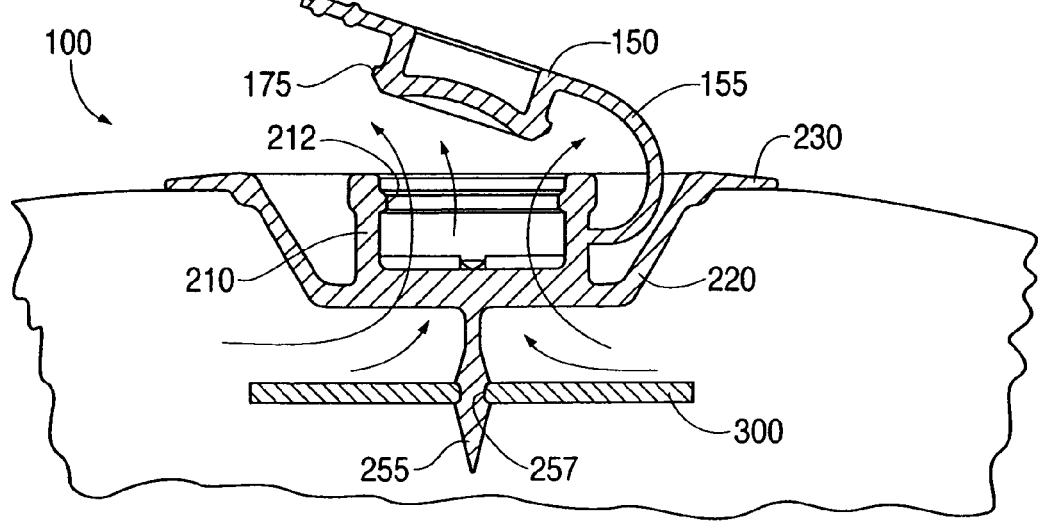
FIG. 11 is a cross-sectional view of the valve illustrated in FIG. 1 taken along the line A—A in FIG. 3, when the valve is in the second configuration and the valve cap is in an open position.
Figure 12:
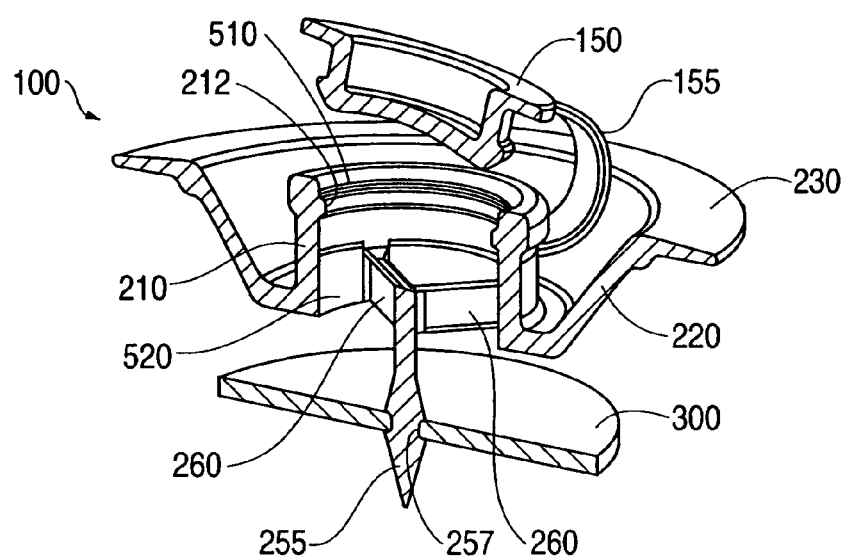
FIG. 12 is a is a cross-sectional view of the valve illustrated in FIG. 1 taken along the line B—B in FIG. 3, when the valve is in the second configuration and the valve cap is in an open position.

When the valve 100 is moved to the second configuration, the check valve 300 is axially repositioned as illustrated in FIGS. 9–12. In the second configuration, the check valve 300 is positioned away from the conduit 500, and air within the device D can enter the conduit 500. When the cap 150 is disposed in the conduit 500, air is maintained in the device D as illustrated in FIGS. 9 and 10. When the cap 150 is removed from the conduit 500, air rapidly escapes through the valve 100 when in the second configuration as illustrated in FIGS. 11 and 12.

In the embodiment described above in which no cap 150 is included with the valve 100, simply moving the valve 100 to the second configuration will cause air to exit through the valve.

Figure 13:
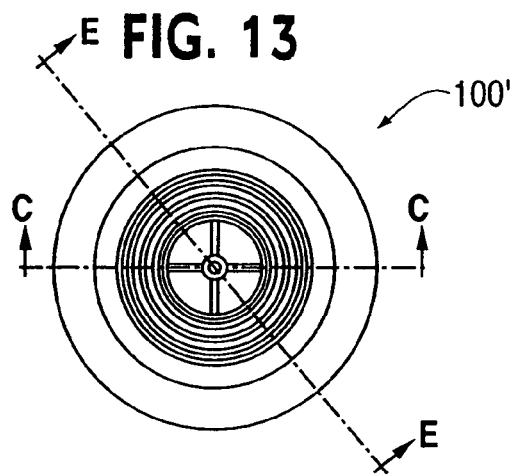
FIG. 13 is a top plan view of a valve according to an embodiment of the invention.
Figure 14:
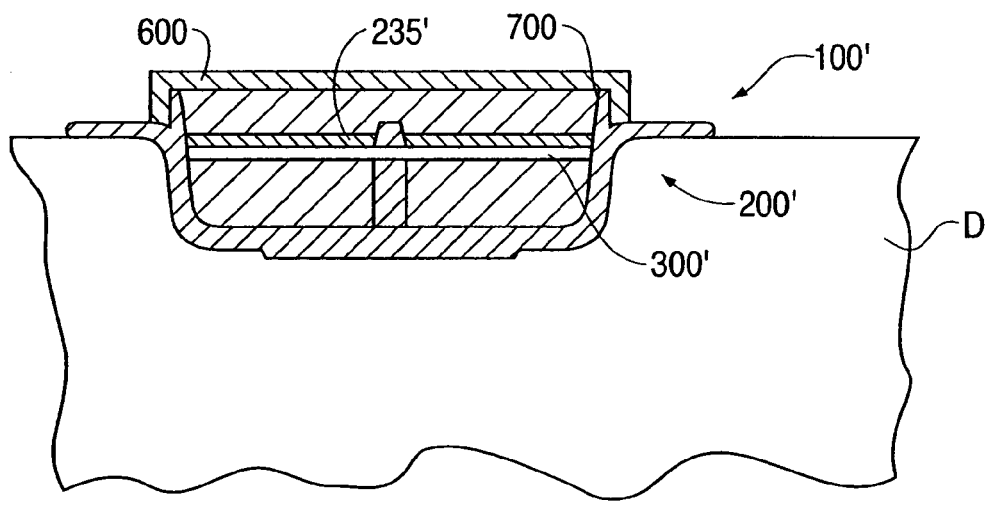
FIG. 14 is a cross-sectional view of the valve illustrated in FIG. 13 taken along the line C—C in FIG. 13, when the valve is in a first configuration.
Figure 15:
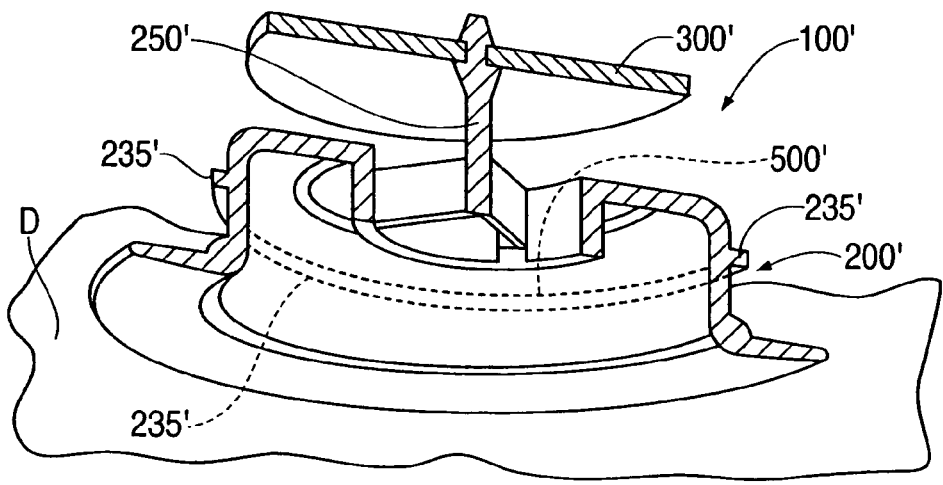
FIG. 15 is a cross-sectional view of the valve illustrated in FIG. 13 taken along the line E—E in FIG. 3, when the valve is in the second configuration.

FIGS. 13–15 illustrate a valve 100' according to another embodiment of the invention. The valve 100' includes a valve body 200' that defines a conduit 500'. The valve 100' also includes a substantially flexible control element or check valve 300' that is configured to permit the flow of air through the conduit 500' into the inflatable device D to which the valve 100' is coupled.

The valve 100' is movable between a first configuration illustrated in FIG. 14, in which the valve body 200' is retracted into device D, and a second configuration illustrated in FIG. 15, in which the valve body 200' is expanded above the device D.

When the valve 100' is in the first configuration, air can be introduced into the valve 100'. A cover 600 is coupled to the valve body 200' to provide an air-tight seal between the conduit 500' and the check valve 300'. A flange 700 extends around the perimeter of the valve 100' and is configured to form the air-tight seal with the cover 600. A valve seat 235' extends around the interior of the valve body 200' to maintain an air-tight seal between the check valve 300' and the valve body 200' when in the first configuration illustrated in FIG. 14.

When the valve 100' is in the second configuration, the check valve 300' is disposed away from the valve body 200' and air readily exits the device D through the valve 100'. A retention element 250' couples the check valve 300' to the valve body 200'.

While particular, illustrative embodiments of the invention have been described, numerous variations and modifications exist that would not depart from the scope of the invention. For example, the valve body 200 can be configured to be axially repositioned by virtue of a screw-type mechanism to move the valve body from the first configuration to the second configuration.

Although the valve body as described above includes base member 230, in an alternative embodiment, the first chamber 210 and the second chamber 220 can be coupled within a socket provided on the inflatable device or could be coupled directly to the inflatable device without the benefit of base 230.

Although the valve 100 as described above includes a valve body 200 that has two separate chambers 210, 220, alternatively, the valve body 200 need only define a single chamber.

Although the support post 255 of retention element 250 as described above includes a detent 257 to retain the check valve 300, alternatively, the support post 255 need not have a detent and the check valve can be fixedly adhered to the support post 255. Moreover, the check valve need not have an opening for slidably engaging the support post 255, but can simply be fixedly coupled to an end of the support post 255. Moreover, although the support post 255 as illustrated is configured to be coaxial with the valve body 200, alternatively, the support post 255 can be offset from the axis of the valve body 200. In such a configuration, during inflation, the check valve 300 would flex about the post, but would be off center from the conduit.

Although the retention element 250 is described above as including a single support post 255, a plurality of support posts may be provided.

Although the check valve 300 is described above as being formed from rubber or plastic, any material that is somewhat flexible and configured to selectively engage the valve body as described above could be used. Moreover, although the check valve 300 is described above as being disposed adjacent the end of the conduit 500, the check valve 300 can be positioned at any location within the conduit 500. Additionally, the check valve 300 need not be dimensioned as illustrated. Any dimension suitable to seal the conduit can be used.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalence.

The previous description of the embodiments is provided to enable any person skilled tin the art to make or use the invention. While the invention has been particularly shown and described with reference to embodiments thereof, it will be understood by those skilled in art that various changes in form and details may be made therein without departing from the spirit and the invention.

What is claimed is:

1. A valve, comprising:
  a body portion defining a conduit; and
  a control element coupled to the body portion and configured to selectively engage the body portion adjacent the conduit, the control element configured to be axially repositioned based on axial movement of the body portion, the body portion being movable between a first configuration in which the control element is sealingly coupled to the body portion and a second configuration in which the entire control element is disposed a spaced distance from the body portion.

2. The valve of claim 1, further comprising:
  a cap configured to be coupled to the body portion.

3. The valve of claim 1, further comprising a retention element coupled to the body portion substantially within the conduit, the control element being coupled to the retention element.

4. The valve of claim 1, wherein the control element includes a substantially flexible membrane.

5. The valve of claim 4, wherein the control element is at least one of rubber or plastic.

6. The valve of claim 3, wherein the retention element includes
  at least one rib disposed within the conduit, and
  a post coupled to the at least one rib, the post extending substantially along an axis of the conduit.

7. The valve of claim 1, wherein the body portion is an unitary construction.

8. The valve of claim 1, wherein the body portion includes a base member, the conduit being defined by a chamber,
  in the first configuration, the chamber is disposed substantially above the base member, and
  in the second configuration, the chamber is disposed substantially below the base member.

9. The valve of claim 1, wherein the body portion includes a base member, the conduit being defined by a chamber having a first end and a second end,
  the first end is disposed substantially above the base member in the first configuration, and
  the first end is disposed substantially coplanar with the base member in the second configuration.

10. The valve of claim 1, wherein the body portion includes a base member, the conduit being defined by a chamber having a first end and a second end,
  the first end is disposed substantially above the base member in the first configuration, and
  the first end is disposed substantially below the base member in the second configuration.

11. A valve, comprising:
  a body portion reconfigurable between a first configuration and a second configuration, the body portion having
    a base member,
    a first chamber having a first diameter, a second chamber coupled between the first chamber and the base member and defining an opening having a second diameter greater than the first diameter; and a control element coupled to the body portion, the control element being axially movable with respect to the first chamber and being disposed a fixed distance from the first chamber when the body portion is in the first configuration and when the body portion is in the second configuration.

12. The valve of claim 11, wherein in the first configuration, the first chamber is disposed above, and coaxially with, the second chamber, and in the second configuration, the first chamber is disposed substantially within, and substantially concentric with, the second chamber.

13. The valve of claim 11, further comprising:
a cap configured to be coupled to the body portion.

14. The valve of claim 11, further comprising a retention element coupled to the body portion substantially within the conduit, the control element being coupled to the retention element.

15. The valve of claim 11, wherein the control element includes a substantially flexible membrane.

16. The valve of claim 15, wherein the control element is at least one of rubber or plastic.

17. The valve of claim 14, wherein the retention element includes
at least one rib disposed within the conduit, and
a post coupled to the at least one rib, the post extending substantially along an axis of the conduit.

18. The valve of claim 11, wherein in the first configuration, the first chamber is disposed substantially above the base member and in the second configuration the first chamber is disposed substantially below the base member.

19. The valve of claim 11, wherein in the first configuration, the first chamber and the second chamber are disposed substantially above the base member and in the second configuration the first chamber and the second chamber are disposed substantially below the base member.

20. A valve, comprising:
a body portion reconfigurable between a first configuration and a second configuration, the body portion having,
a base member,
a first chamber having a diameter, and
a second chamber coupled between the first chamber and the base member when the body portion is in the first configuration, the second chamber defining an opening having a diameter greater than the diameter of the first chamber, the second chamber having a first end coextensive with at least a portion of the first chamber and a second end coextensive with at least a portion of the base member; and
a control element coupled to the body portion, the control element being sealingly coupled to the second end of the second chamber when the body portion is in the first configuration.

* * * * *

UNITED STATES PATENT AND TRADEMARK OFFICE
CERTIFICATE OF CORRECTION

PATENT NO. : 6,990,994 B2  Page 1 of 1
DATED : January 31, 2006
INVENTOR(S) : David L. Reeb et al.

It is certified that error appears in the above-identified patent and that said Letters Patent is hereby corrected as shown below:

Column 6,
Line 6, replace "tin" with -- in --.

Signed and Sealed this

Thirtieth Day of May, 2006

JON W. DUDAS
*Director of the United States Patent and Trademark Office*